(12) United States Patent
Balasubramanian

(10) Patent No.: US 8,897,513 B2
(45) Date of Patent: Nov. 25, 2014

(54) METHOD OF SELECTING A STENT BASED ON STRESS OF A BLOOD VESSEL

(71) Applicant: K V Balasubramanian, Bangalore (IN)

(72) Inventor: K V Balasubramanian, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 13/729,213

(22) Filed: Dec. 28, 2012

(65) Prior Publication Data

US 2014/0185886 A1 Jul. 3, 2014

(51) Int. Cl.
*G06K 9/00* (2006.01)
*G06T 7/00* (2006.01)

(52) U.S. Cl.
CPC .................... *G06T 7/0012* (2013.01)
USPC ........................................ 382/126; 623/1.11

(58) Field of Classification Search
CPC ........... G06T 2207/30101; G06T 2207/30104; G06T 2211/404; G06T 7/0012
USPC ......... 382/128–130; 623/1.1, 1.11, 1.15–1.22
See application file for complete search history.

(56) References Cited

U.S. PATENT DOCUMENTS

| | | | | |
|---|---|---|---|---|
| 7,804,991 | B2 * | 9/2010 | Abovitz et al. | 382/128 |
| 2006/0155358 | A1 * | 7/2006 | LaDuca et al. | 623/1.11 |
| 2007/0067012 | A1 * | 3/2007 | George et al. | 623/1.12 |
| 2008/0269865 | A1 * | 10/2008 | Snow et al. | 623/1.11 |

* cited by examiner

*Primary Examiner* — Shefali Goradia
(74) *Attorney, Agent, or Firm* — Harness, Dickey & Pierce, P.L.C.

(57) ABSTRACT

A method of selecting a stent for placing in an occluded segment of a blood vessel is presented. The method uses a diastolic and a systolic image of the blood vessel. In the method a first area is selected in a region on the diastolic image. The first area includes at least the occluded segment. Subsequently, a first length of the blood vessel in the first area is determined. A second area is selected in a corresponding region on the systolic image of the blood vessel. The second area includes at least the occluded segment. The first area is congruent to the second area. Subsequently, a second length of the blood vessel in the second area is determined. A stress in the occluded segment is determined by comparing the first length and the second length. Finally, the stent based on the stress in the occluded segment is selected.

10 Claims, 6 Drawing Sheets

METHOD OF SELECTING A STENT BASED ON STRESS OF A BLOOD VESSEL

FIELD OF THE INVENTION

The present invention is generally related to a stent involving a blood vessel segment, and more particularly to a method of selecting a stent for placing in an occluded segment of a blood vessel.

BACKGROUND OF THE INVENTION

Vascular stenosis, an abnormal narrowing in a blood vessel or other tubular organ or structure, is a major health problem around the globe. Stenosis is most frequently found to affect coronary blood vessels. It results in partial or complete obstruction of blood flow in a coronary artery, as by a thrombus or a progressive buildup of atherosclerotic plaque and leads to major cardiovascular diseases that remain a leading cause of death.

As a result of occlusion caused by stenosis, blood flow in the blood vessel is diminished. When occlusion occurs in coronary blood vessels, for example the coronary artery, blood flow to the heart muscles is decreased causing ischemia induced angina and in severe cases myocardial infarcts and death. Insertion of stents in occluded blood vessels has been a substantially successful procedure for treating stenosis. As a common practice, a stent is deployed after patency has been restored in the occluded blood vessel. The deployed stent remains implanted to prevent a newly opened blood vessel from constricting spontaneously.

Stent selection is a critical factor in the successful maintenance of blood flow through the blood vessels. Stent are manufactured from different materials and have different structural designs and thus different stents have different flexibilities or radial stiffness.

The selection of a suitable stent is important because when a rigid stent is placed in a highly oscillating vessel the adjoining walls of the blood vessel experience friction from the rigid stent and thereby get injured. The injury to the blood vessel wall triggers physiological response such as thrombosis which is often followed by an inflammatory immune response finally leading to restenosis. On the other hand flexible stents are expensive to manufacture owing to high quality materials required for their manufacturing and intricate fabrication processes due to highly complex structural designs, and thus placing a flexible stent in a rigid vessel results in increased costs.

Therefore, it is desirable to develop a technique of selecting a stent that accounts for stress experienced by a blood vessel in which the stent is to be inserted. The technique is desirable to be simple and non-invasive.

SUMMARY OF THE INVENTION

An object of the invention is to develop a technique for selecting a stent for placing in an occluded segment of a blood vessel.

Another object of the invention is to develop a technique which, for selecting a stent for placing in an occluded segment of a blood vessel, takes into account a stress in the occluded segment of the blood vessel.

The aforementioned objects are achieved with a method of selecting a stent for placing in an occluded segment of a blood vessel.

In accordance with an aspect of the present technique, a method of selecting a stent for placing in an occluded segment of a blood vessel is provided. The method uses a diastolic image of the blood vessel and a systolic image of the blood vessel. In the method a first area is selected in a region on the diastolic image. The first area includes at least the occluded segment. Subsequently, a first length of the blood vessel in the first area is determined. Similarly, a second area is selected in a corresponding region on the systolic image of the blood vessel. The second area includes at least the occluded segment. The first area is congruent to the second area. Subsequently, a second length of the blood vessel in the second area is determined. A stress in the occluded segment is determined by comparing the first length and the second length. Finally, the stent based on the stress in the occluded segment is selected.

The present technique has several advantages. It provides a technique for selecting a stent for placing in an occluded segment of a blood vessel. In selecting the stent for placing in the occluded segment of the blood vessel, a stress in the occluded segment is accounted for. As a result, chances of injury to walls of the blood vessel in the occluded segment occurring from placement of rigid stents in highly oscillating blood vessels are obviated, and this subsequently leads to reducing occurrence of restenosis. Furthermore, by use of the present technique it is ensured that flexible stents manufactured from high quality materials and involving intricate fabrication processes are not used in the occluded segments of rigid blood vessels, thereby resulting in reduction in costs of the stents used. The present technique for selecting the stent is simple, easy to implement and non-invasive.

BRIEF DESCRIPTION OF THE DRAWINGS

A full and enabling disclosure of the present technique, including the best mode thereof, directed to one of ordinary skill in the art, is set forth more particularly in the remainder of the specification, which makes reference to the appended figures in which.

Figure 1:
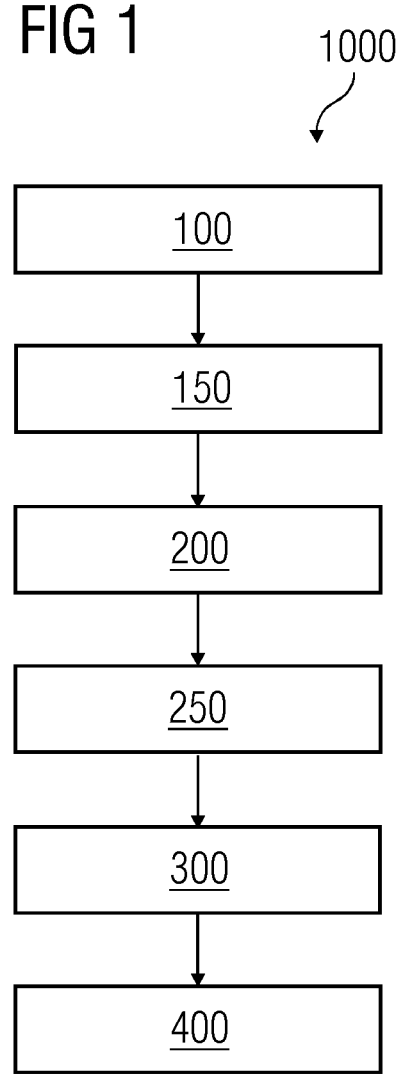
FIG. 1 is a flow chart representing a method for selecting a stent for placing in an occluded segment of a blood vessel.

Repeat use of reference characters in the present specification and drawings is intended to represent same or analogous features or elements of the technique.

DETAILED DESCRIPTION OF THE INVENTION

Reference now will be made in detail to various embodiments of the technique, one example of which is set forth below. Various modifications and variations, as may be perceived by a person skilled in the art, may be made in the present technique without departing from the scope or spirit of the technique. Features illustrated or described as part of one embodiment, may be used on another embodiment. Thus, it is intended that the present technique covers such modifications and variations as come within the scope of the appended claims and their equivalents.

Generally speaking, the present technique is directed at a method for selecting a stent for placing in an occluded segment of a blood vessel. The idea is to consider a stress experienced by the occluded segments as a result of systolic and diastolic movements of the blood vessel in selecting the stent.

The term 'stent', as used herein, include intravascular and/or implantable prosthetic devices, such as a coronary artery stent, other vascular prosthesis, or other radially expanding or expandable prosthesis or scaffold-type implants suitable for placing inside a lumen in an occluded segment of a blood vessel to reopen it or keep it open during or after a surgical procedure.

The terms 'occluded segment', as used herein, means a segment or a portion of a blood vessel containing an occlusion. The occlusion may be a partial occlusion or a completer occlusion.

The 'systolic image', as used herein, means an image acquired during systole. The systolic image of a blood vessel includes an angiographic image of the blood vessel acquired when immediate surroundings of the blood vessel are experiencing systole.

The 'diastolic image', as used herein, means an image acquired during diastole. The diastolic image of a blood vessel includes an angiographic image of the blood vessel acquired when immediate surroundings of the blood vessel are experiencing diastole.

Figure 2:
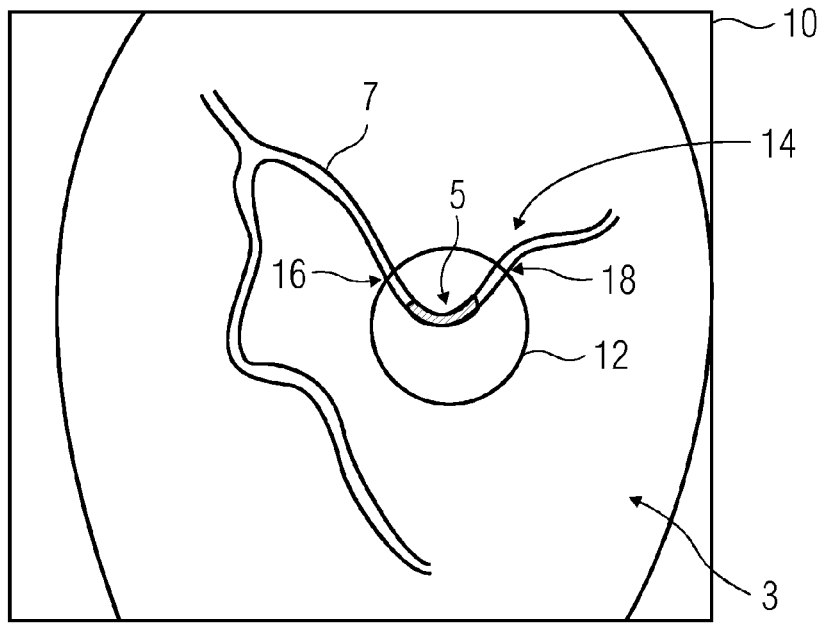
FIG. 2 schematically illustrates a diastolic image of the blood vessel.
Figure 3:
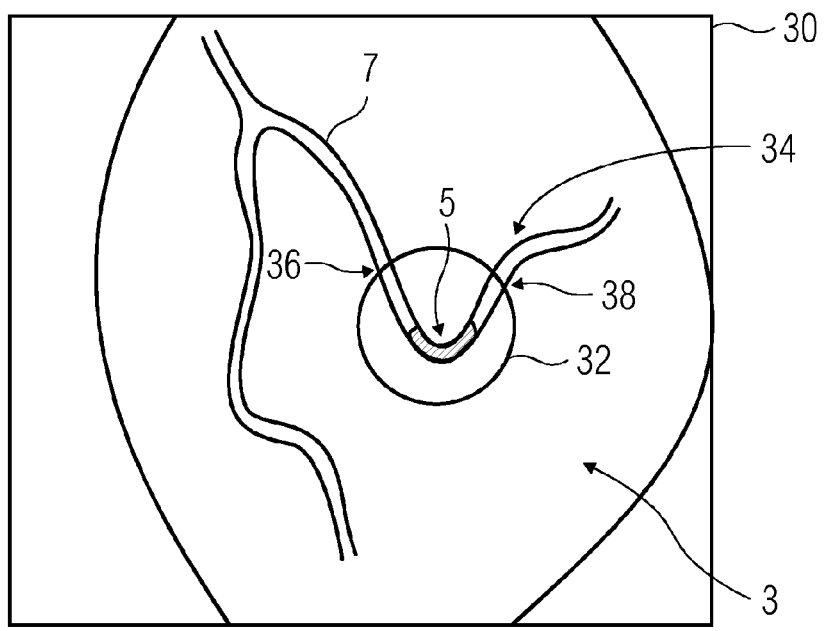
FIG. 3 schematically illustrates a systolic image of the blood vessel.

Reference now is made to FIG. 1 along with FIG. 2 and FIG. 3, to explain a method 1000 for selecting a stent for placing in an occluded segment 5 of a blood vessel 7, in accordance with the present technique. FIG. 2 schematically illustrates a diastolic image 10 of the blood vessel 7 and FIG. 3 schematically illustrates a systolic image 30 of the blood vessel 7. FIG. 2 and FIG. 3 are images of an anatomical structure 3. The anatomical structure 3 may be an organ of a human body for example a heart or a part of the heart such as a left ventricle, a right ventricle, a left atrium, a right atrium, etc or any other anatomical organ in close proximity to the heart. FIG. 1 is a flow chart representing the method 1000 for selecting the stent for placing in the occluded segment 5 of the blood vessel 7. In an exemplary embodiment of the method 1000, the blood vessel 7 is a blood vessel in a myocardial region such as a coronary artery.

Referring to FIG. 1 in combination with FIG. 2, in the method 1000, in accordance with the present technique, a first area 12 is selected in a region 14 on the diastolic image 10 in a step 100. The first area 12 includes at least the occluded segment 5. Subsequently, in a step 150 of the method 1000, a first length of the blood vessel 7 in the first area 12 is determined. The first length is a length of the blood vessel 7 within the first area 12 i.e. a length of the blood vessel 7 between points 16 and 18 as depicted in FIG. 2.

Referring to FIG. 1 in combination with FIG. 3, in the method 1000, a second area 32 is selected in a corresponding region 34 on the systolic image 30 of the blood vessel 7 in a step 200. The second area 32 includes at least the occluded segment 5. The first area 12 is congruent to the second area 32 i.e. the first area 12 has the same size and shape as the second area 32 and thus if the first area 12 is superimposed on the second area 32 or vice versa, the first area 12 and the second area 32 will touch each other at all points. Subsequently, a second length of the blood vessel 7 in the second area 32 is determined in a step 250. The second length is a length of the blood vessel 7 within the second area 32 i.e. a length of the blood vessel 7 between points 36 and 38 as depicted in FIG. 3. It may be noted that the first area 12 and the second area 32 may have any geometrical shape and size. In one exemplary embodiment of the method 1000, the first area 12 and the second area 32 are circular in shape.

It may be noted that the region 14 on the diastolic image 10 of the blood vessel 7 corresponds to the corresponding region 34 on the systolic image 30 of the blood vessel 7. This means that the region 14 has the same or nearly the same relationship with the blood vessel 7 and/or surroundings of the blood vessel 7 i.e. a set of pixels in the region 12 can be identified as the same pixels in the corresponding region 34. The surroundings of the blood vessel 7 are regions in proximity of the blood vessel 7 for example a part of a myocardial wall constitutes a surrounding of a coronary artery that runs across the part of the myocardial wall. Generally speaking, two regions on two different images of an object are said to be corresponding to one another if the regions have at least some shared characteristics and are similar in position with respect to a portion of the object represented in each of the regions. The corresponding regions on different images of the same object may be identified by using correlation based approach or feature based approach. Such approaches for identifying corresponding regions are well known in the art of image processing and thus the same have not been described herein for sake of brevity.

Referring to FIG. 1, in the method 1000, in accordance with the present technique, a stress in the occluded segment 5 is determined by comparing the first length and the second length in a step 300. Finally, in a step 400, the stent based on the stress in the occluded segment 5 is selected.

In an exemplary embodiment of the method 1000, the comparison of the first length and the second length in the step 300 is performed according to the following equation:

$$\sigma = E \times \frac{(l_2 - l_1)}{l_1}$$

wherein σ is the stress, E is Young's modulus, $l_2$ is the second length and $l_1$ is the first length. The stress and the Young's modulus may be expressed in unit of pressure for example pascal (Pa), bar, and so forth and the first and the second lengths are expressed in unit of length for example centimeter (cm), millimeter (mm), and so forth.

In another exemplary embodiment of the method 1000, the step 400 includes choosing a suitable stent from a set of stents. A stiffness value for each stent of the set of stents is known. The stiffness value for each stent represents an ability of the stent to resist deformation in response to an applied stress. In the method 1000, the suitable stent is chosen such that the stiffness value of the suitable stent is equal to or greater than the stress in the occluded segment 5 as determined in the step 300. In an exemplary embodiment of the method 1000, the stiffness value for each stent may represent a radial stiffness or a bending stiffness for the stents in the set of the stents. The radial stiffness and bending stiffness are well known in art of stent planning and thus the same has not been described herein for sake of brevity.

Figure 4:
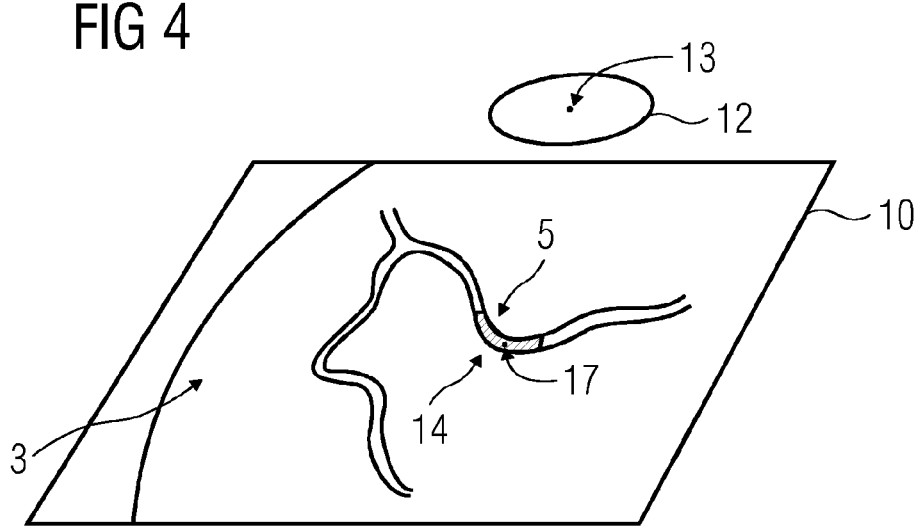
FIG. 4 depicts a schematic representation for selecting a first area on the diastolic image of the blood vessel according to an exemplary embodiment of the method of the present technique.
Figure 5:
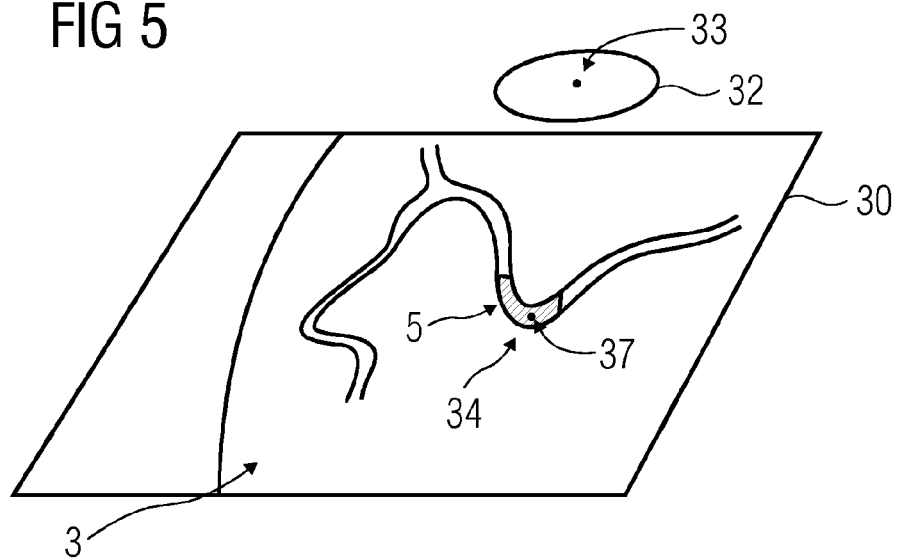
FIG. 5 depicts a schematic representation for selecting a second area on the systolic image of the blood vessel according to an exemplary embodiment of the method of the present technique.

Now referring to FIG. 4 and FIG. 5 to explain an exemplary embodiment of the method 1000. FIG. 4 depicts a schematic representation of the step 100 of the method 1000 of the present technique and FIG. 5 depicts a schematic representation of the step 200 of the method 1000 of the present technique.

As depicted in FIG. 4, in the step 100, in selecting the first area 12, a geometric center 13 of the first area 12 coincides with a geometric center 17 of the occluded segment 5 in the diastolic image 10. The geometric center 13 of the first area 12 is a centroid of the first area 12. Similarly, the geometric center 17 of the occluded segment 5 is a centroid of the occluded segment 5 as represented in the diastolic image 10. Furthermore, as depicted in FIG. 5, in the step 200, in selecting the second area 32 a geometric center 33 of the second area 32 coincides with a geometric center 37 of the occluded segment 5 in the systolic image 30. The geometric center 33 of the second area 32 is a centroid of the second area 32. Similarly, the geometric center 37 of the occluded segment 5 is a centroid of the occluded segment 5 as represented in the systolic image 30. The geometric centers 13, 17, 33, 37 may be calculated by using known methods for determining centroids of objects for example by plumb line method, balancing method, and so forth and thus the same has not been described herein for sake of brevity. In another exemplary embodiment of the method 1000, the first area 12 and the second area 32 are circular in shape, and thus the geometric centers 13, 33 are centers of the circle forming the first area 12 and the second area 32, respectively.

Figure 6:
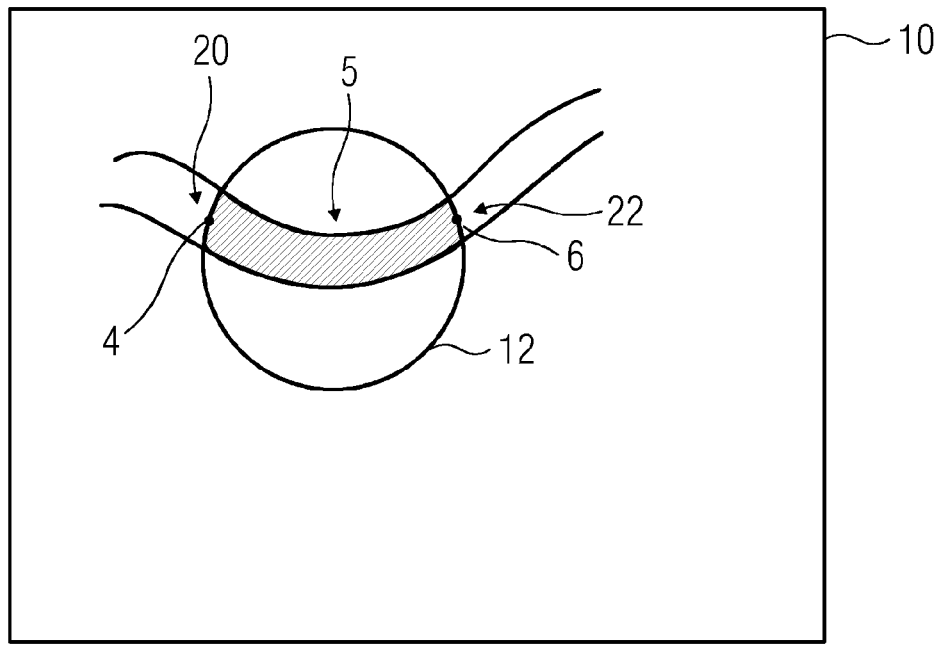
FIG. 6 depicts a schematic representation for selecting the first area on the diastolic image of the blood vessel according to another exemplary embodiment of the method of the present technique.

Now referring to FIG. 6 which depicts a schematic representation the step 100 for selecting the first area 12 on the diastolic image 10 of the blood vessel 7 according to another exemplary embodiment of the method 1000 of the present technique. In the step 100, the first area 12 is selected such that a first end 20 of the occluded segment 5 coincides with a first point 4 on a perimeter of the first area 12 and a second end 22 of the occluded segment 5 coincides with a second point 6 on the perimeter of the first area 12.

Figure 7:
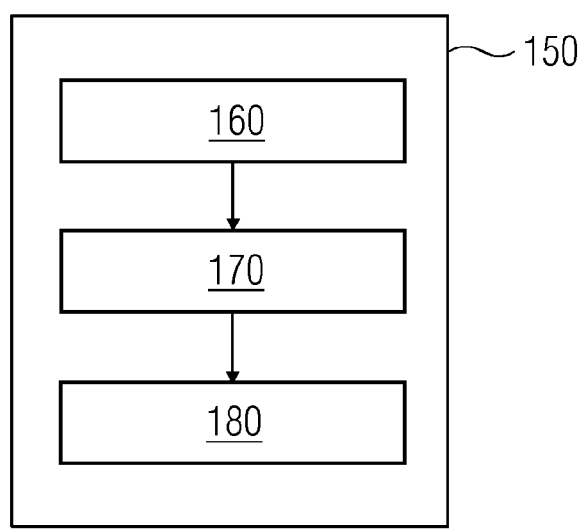
FIG. 7 is a flow chart representing an exemplary embodiment of the method of the present technique for determining a first length in the first area.
Figure 8:
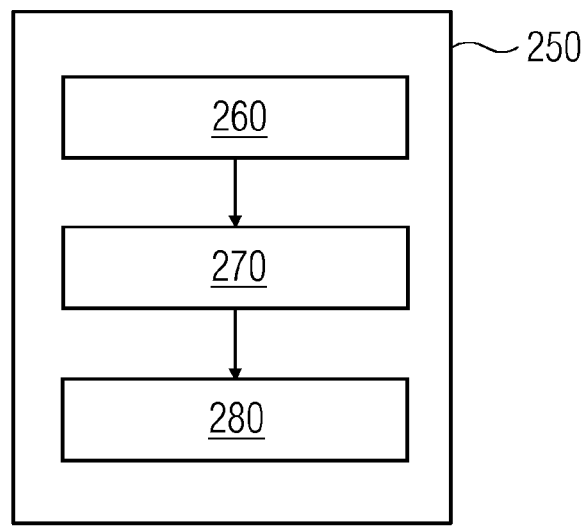
FIG. 8 is a flow chart representing an exemplary embodiment of the method of the present technique for determining a second length in the second area.

Now referring to FIG. 7 and FIG. 8 to understand the step 150 and step 250 respectively in exemplary embodiments of the method 1000.

FIG. 7 is a flow chart representing an exemplary embodiment of the method 1000 of the present technique for determining the first length in the first area. As depicted in the flow chart of FIG. 7, the step 150 may further include a step 160 of detecting a contour of the blood vessel in the first area. The contour of the blood vessel in the first area comprises a first and a second boundary of the blood vessel in the first area. The contour may be detected by simple contour detection algorithms. Such contour detection algorithms are well known in the art of image processing and thus the same has not been described herein for sake of brevity. Subsequently, in a step 170 a mean of lengths of the first and the second boundary of the blood vessel in the first area is determined. Finally, in a step 180 the mean of the lengths of the first and the second boundary of the blood vessel in the first area is used as the first length.

FIG. 8 is a flow chart representing an exemplary embodiment of the method 1000 of the present technique for determining the second length in the second area. As depicted in the flow chart of FIG. 8, the step 250 may further include a step 260 of detecting a contour of the blood vessel in the second area. The contour of the blood vessel in the second area comprises a first and a second boundary of the blood vessel in the second area. As mentioned earlier, the contour may be detected by simple and well known contour detection algorithms. Subsequently, in a step 270 a mean of lengths of the first and the second boundary of the blood vessel in the second area is determined. Finally, in a step 280 the mean of the lengths of the first and the second boundary of the blood vessel in the second area is used as the second length.

Figure 9:
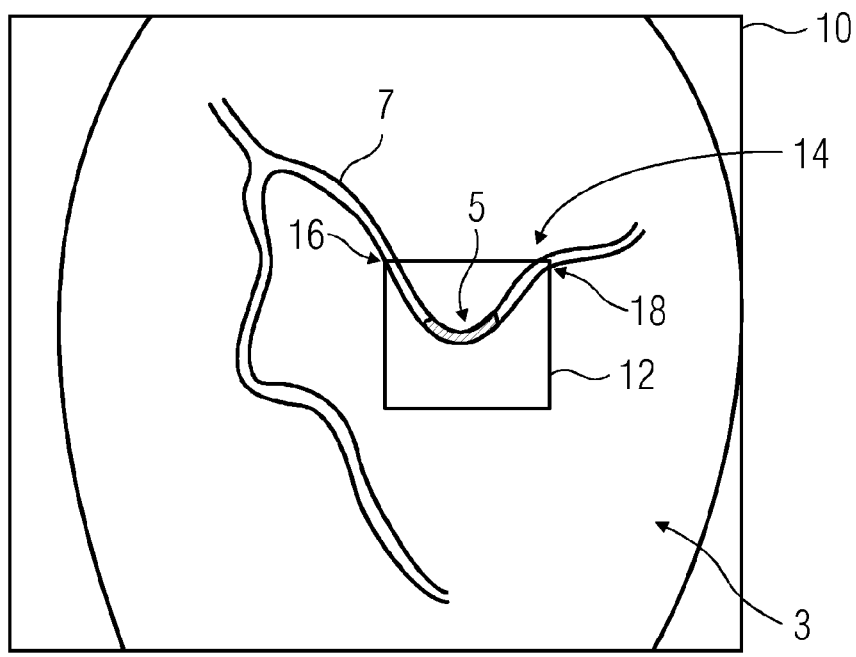
FIG. 9 depicts a schematic representation for selecting the first area on the diastolic image of the blood vessel according to an exemplary embodiment of the method of the present technique.
Figure 10:
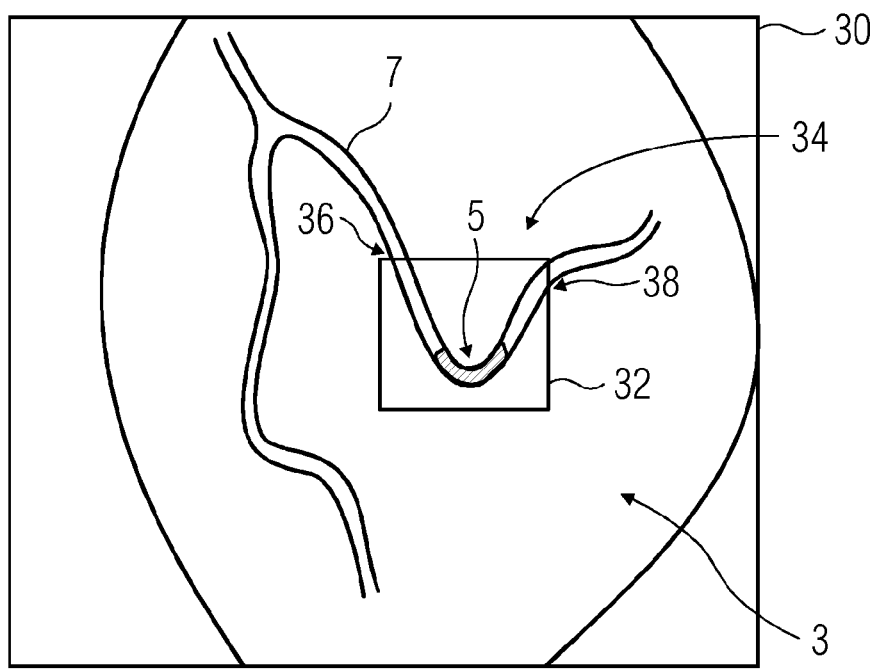
FIG. 10 depicts a schematic representation for selecting the second area on the systolic image of the blood vessel according to an exemplary embodiment of the method of the present technique.

It may be noted that according to the present technique and as mentioned earlier, the first area 12 as depicted in FIG. 2 and the second area 32 as depicted in FIG. 3 may be of any shape. This aspect of the present technique is depicted in FIG. 9 and FIG. 10. FIG. 9 depicts a schematic representation for selecting the first area 12 on the diastolic image 10 of the blood vessel 7 according to an exemplary embodiment of the method 1000 of the present technique, and FIG. 10 depicts a schematic representation for selecting the second area 32 on the systolic image 30 of the blood vessel 7 according to the exemplary embodiment of the method 1000 of the present technique. As depicted the first area 12 and the second area 32 are rectangular in shape. It may further be noted that, for geometric shapes of the first and the second area 12, 32 other than circles, an orientation of the first area 12 with respect to the diastolic image 10 should be same as an orientation of the second area 32 with respect to the systolic image 30. The orientations may be matched by fixing relative positions of the first area 12 with respect to sides of the diastolic image 10 and the second area 32 with respect to sides of the systolic image 30, respectively.

Example

An example has been presented to explain the present technique. The example is explained with reference to FIG. 2 and FIG. 3.

Say, in the method 1000, the first length ($l_1$) i.e. length of the blood vessel 7 between points 16 and 18 is 13.21 mm. Similarly, the second length ($l_2$) i.e. length of the blood vessel 7 between points 36 and 38 is 15.21 mm. Say, the blood vessel 7 is a coronary artery and Young's modulus (E) is around $10^5$ Pa to $10^6$ Pa, approximately $5\times10^5$ Pa. Then, a stress ($\sigma$) in the occluded segment 5 is calculated to be 0.7570023 bar.

The following table represents a set of stents and their corresponding stiffness value which herein is a collapse pressure for the stents:

TABLE 1

| Serial no. | Type of stent | Collapse pressure (expressed in bar) |
| --- | --- | --- |
| 1 | A | 0.53 |
| 2 | B | 0.60 |
| 3 | C | 0.70 |
| 4 | D | 0.80 |
| 5 | E | 1.50 |

In the example, for the stress in the occluded segment 5 of approximately 0.757 bar, the suitable stent is chosen from the set of the stents. In the present example, the suitable stent is Serial no. 4 as it can withstand up to 0.80 bar.

Although the present technique has been described with reference to specific embodiments, this description is not meant to be construed in a limiting sense. Various modifications of the disclosed embodiments, as well as alternate embodiments of the technique, will become apparent to persons skilled in the art upon reference to the description of the technique. It is therefore contemplated that such modifications can be made without departing from the embodiments of the present technique as defined.

The invention claimed is:

1. A method of selecting a stent for placing in an occluded segment of a blood vessel, the method comprising:
    selecting a first area in a region on a diastolic image of the blood vessel, wherein the first area includes at least the occluded segment,
    determining a first length of the blood vessel in the first area,
    selecting a second area in a corresponding region on a systolic image of the blood vessel, wherein the second area includes at least the occluded segment, and wherein the first area is congruent to the second area,
    determining a second length of the blood vessel in the second area,
    determining a stress in the occluded segment by comparing the first length and the second length, and
    selecting the stent based on the stress in the occluded segment.

2. The method according claim 1, wherein the comparison is performed according to the following equation:

$$\sigma = E \times \frac{(l_2 - l_1)}{l_1}$$

wherein $\sigma$ is the stress, E is Young's modulus for the blood vessel, $l_2$ is the second length and $l_1$ is the first length.

3. The method according to claim 1, wherein the first area and the second area are circular in shape.

4. The method according to claim 1, wherein in selecting the first area a geometric center of the first area coincides with a geometric center of the occluded segment in the diastolic image and in selecting the second area a geometric center of the second area coincides with a geometric center of the occluded segment in the systolic image.

5. The method according to claim 4, wherein the first area and the second area are circular in shape.

6. The method according to claim 1, wherein the first area is selected such that a first end of the occluded segment coincides with a first point on a perimeter of the first area and a second end of the occluded segment coincides with a second point on the perimeter of the first area.

7. The method according to claim 1, wherein determining the first length of the blood vessel in the first area comprises:
    detecting a contour of the blood vessel in the first area, wherein the contour of the blood vessel in the first area comprises a first and a second boundary of the blood vessel in the first area,
    determining a mean of lengths of the first and the second boundary of the blood vessel in the first area,
    using the mean of the lengths of the first and the second boundary of the blood vessel in the first area as the first length, and
    wherein determining the second length of the blood vessel in the second area comprises:
        detecting a contour of the blood vessel in the second area, wherein the contour of the blood vessel in the second area comprises a first and a second boundary of the blood vessel in the second area,
        determining a mean of lengths of the first and the second boundary of the blood vessel in the second area,
        using the mean of the lengths of the first and the second boundary of the blood vessel in the second area as the second length.

8. The method according to claim 1, wherein selecting the stent based on the stress in the occluded segment comprises choosing a suitable stent from a set of stents,
    wherein a stiffness value for each stent of the set of stents is known and wherein the stiffness value for each stent represents an ability of the stent to resist deformation in response to an applied stress, and
    wherein the suitable stent is chosen such that the stiffness value of the suitable stent is equal to or greater than the stress.

9. The method according to claim 1, wherein the blood vessel is a blood vessel in a myocardial region.

10. The method according to claim 9, wherein the blood vessel in the myocardial region is a coronary artery.

* * * * *